Oct. 1, 1968　　　　L. J. STOFFER　　　3,403,844
BLADED MEMBER AND METHOD FOR MAKING
Original Filed Feb. 25, 1966　　　　2 Sheets-Sheet 2
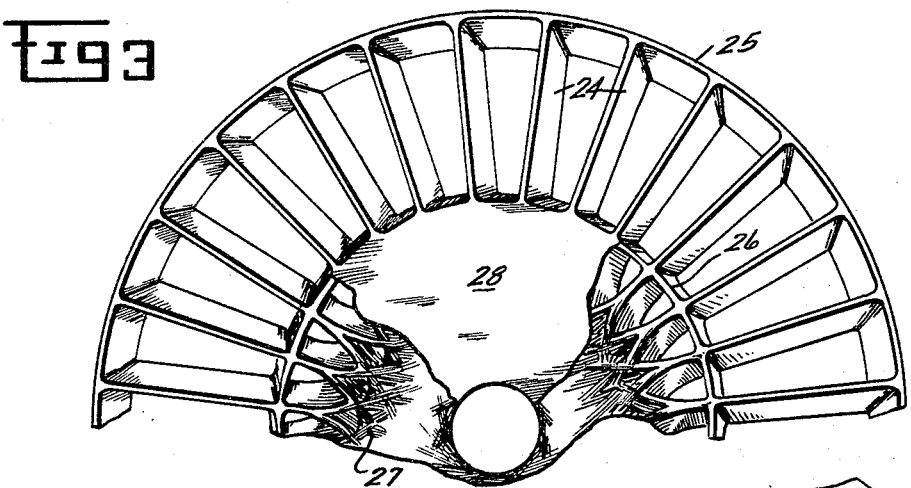
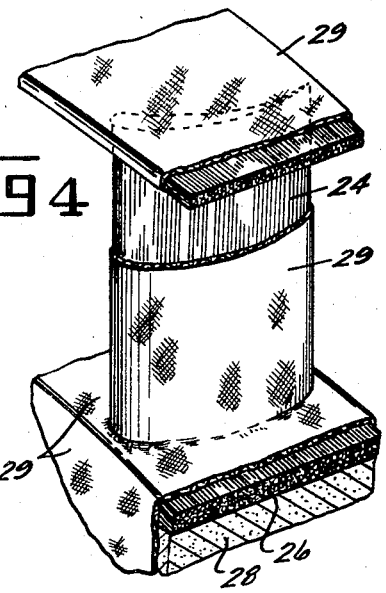
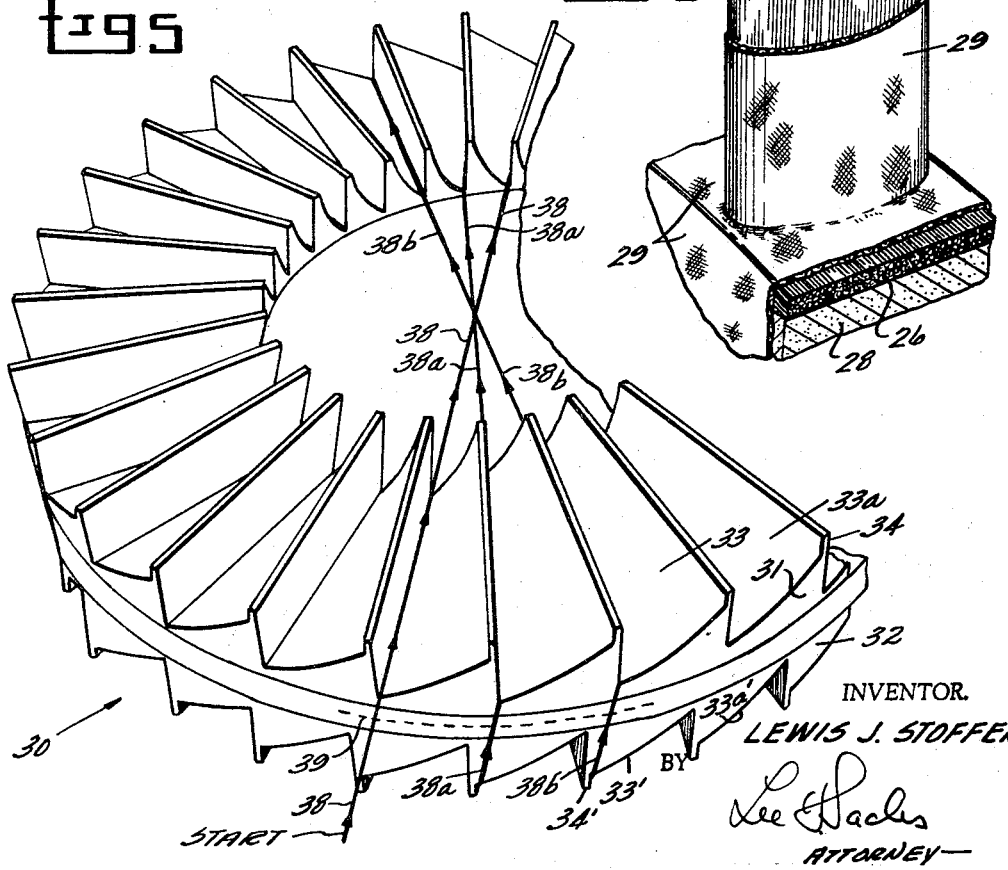
INVENTOR.
LEWIS J. STOFFER
BY
Lee Hacles
ATTORNEY

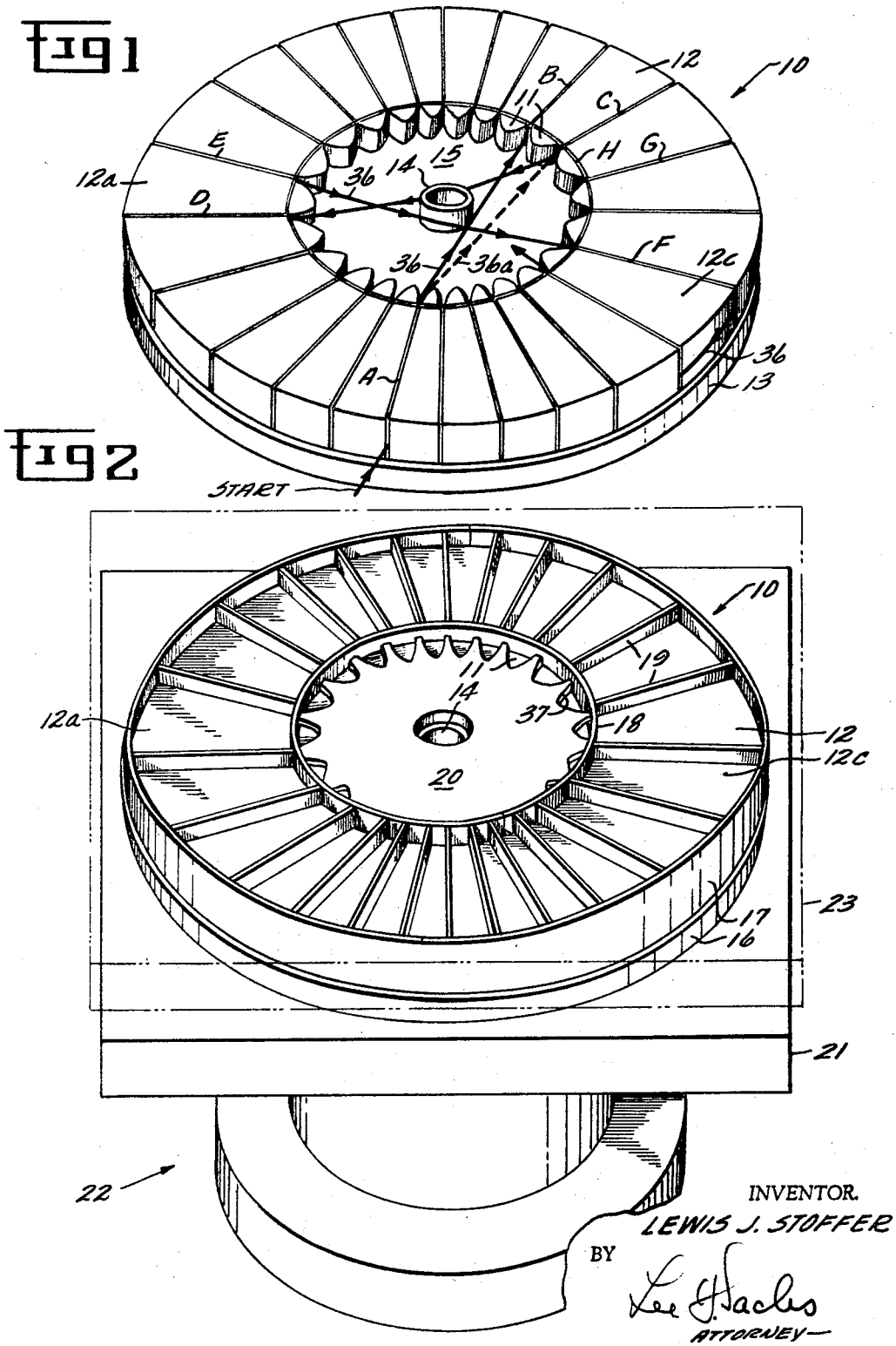

United States Patent Office

3,403,844
Patented Oct. 1, 1968

3,403,844
BLADED MEMBER AND METHOD
FOR MAKING
Lewis J. Stoffer, Cincinnati, Ohio, assignor to General
Electric Company, a corporation of New York
Continuation of application Ser. No. 541,410, Feb. 25,
1966. This application Oct. 2, 1967, Ser. No. 672,106
15 Claims. (Cl. 230—134)

ABSTRACT OF THE DISCLOSURE

The disclosure illustrates a method of making a compositely formed, bladed rotor of the type which can be used in the compressor of a gas turbine engine. The rotor is fabricated by drawing a continuous strand of fibrous material, e.g., glass fibers, along blade-defining portions of a form. The strand is drawn under tension in accordance with a predetermined winding pattern of reaches so that the blade-defining portions of the form are filled to approximately the same extent. Provision is also made for winding a circular band which encompasses the outer ends of the blade to give additional strength. The wound strands may be covered with glass cloth to protect the fiber thereof. The compositely formed rotor is bonded together, as by an appropriate resin, while on the form. An alternate embodiment illustrates the use of a winding form having blade-defining portions on opposite sides which enable the simultaneous winding of two rotors.

---

This application is a continuation of application Ser. No. 541,410, filed Feb. 25, 1966, now abandoned.

The present invention relates to circular bladed members such as bladed wheels and bladed fluid guide members. More particularly it relates to circular rotor or stator members having integral blades radiating from a support portion and to a method of making such members.

In many devices wherein fluid-moving or fluid-guiding articles such as rotors, stators or fluid guide members are to be used, for example, in gas turbine apparatus, it is desirable that components such as blades and shrouds normally included in such an article be constructed as an integral part of the article. A purpose for such a construction is to reduce assembly costs and mechanical failure under conditions of heavy loading. Attempts have been made to provide fluid-moving rotors by machining the article from a single metallic piece or casting metal alloys into complex molds. However, the raw material costs and the time required for such machining as well as problems involved in making and using the complicated casting molds required, have increased the cost of such articles so as to militate against their use. Additionally, metal rotors made by either of the above-mentioned casting or machining methods are too heavy for use in applications requiring a high ratio of fluid-moving capacity to rotor weight.

To satisfy the requirement of a high capacity-to-weight ratio, lightweight plastic rotors have been considered for use. Where unreinforced plastics are used, the rotor can be used only in certain relatively low loading applications due to the poor structural integrity of the plastic material. To improve this structural integrity, bundles of reinforcing fibers have been used to form a core about which the plastic blades are molded. However, these bundles are seldom stressed equally, after assembly in a rotor, as they should be for optimum rotor performance. In the absence of equal stressing around the entire rotor, the blades tend to distort unevenly under heavy centrifugal loading thereby detrimentally altering the performance characteristics of the rotor.

In some cases, an outer circular shroud is required around the blades. Where the circular shroud is attached to the tips of the bundle-reinforced blades, the uneven distorting effects of heavy centrifugal loading are intensified. The use of such shrouds in prior art plastic rotors has caused an additional problem in that the shroud is not formed integrally with the blade-reinforcing bundles so that material failure may occur at the shroud's junctures with the blade tips.

It is accordingly one object of the present invention to provide an improved method of making a complete or integral bladed circular article or article core wherein length portions or reaches of reinforcing materials are equally stressed during the formation of the article or core so as to minimize the uneven distorting effects of centrifugal loading.

It is another object of the present invention to provide an improved method of making an integral rotor or fluid guide member having a circular shroud formed integrally with reaches of blade-reinforcing materials.

Still another object is to provide an improved bladed member having a reinforcing core in which reaches of reinforcing material are equally stressed.

It is a further object of the present invention to provide an improved rotor having a reinforcing core in which reaches of reinforcing materials are equally stressed and in which a circular shroud is formed integrally with the reaches of blade-reinforcing materials.

To fulfill these objects, the present invention provides a method of making an integral bladed circular member, such as a rotor disk comprising a circular support and blades radiating from the support. The method includes winding a continuous strand, such as a roving, filament or tape, on a suitable circular form while applying two forces to the strand. The first force is a uniform tension force applied along the axial direction of the strand; the second force is applied at an angle to the axis of the strand and toward the form. The continuous strand is wound on the form in a series of reaches, each consecutive reach being at an angle different from that of the next preceding reach. The member is built in multiple layers disposed substantially normal to the central axis of the member. After winding, the strand is bound together on the form, such as by a suitable curable binder preferably carried by the strand, to produce the integral bladed member.

The integral bladed member of the present invention comprises a central support and blades radiating from the support, the support and blades being made from a strand which is integral both with a blade and its adjacent portion of the support. The strand in the blade is under uniform radial tension with respect to the circular member whereas the strand in the support adjacent the blade is under uniform tension generally in the tangential direction with respect to the circular shape of the member.

While the specification concludes with claims particularly pointing out and distinctly claiming the subject matter which constitutes the present invention, the invention may best be understood by reference to the following description when taken in conjunction with the accompanying drawings in which:

FIGURE 1 is an isometric view of a form or jig suitable for use with the method of the present invention, upon which form several reaches of strand material in a partially wound rotor core are shown;

FIGURE 2 is a partially sectional isometric view showing pressure elements suitable for use with the method of the present invention assembled with the form and in position in a heated platen press which may be used to bind the strand into a rotor core;

FIGURE 3 is a fragmentary plan view of an integral bladed rotor core having a central support as well as inner and outer shrouds integral with the blades, the central support partially impregnated with foamable material;

FIGURE 4 is a fragmentary sectional view of a blade of FIGURE 3 and its associated shrouds and support portions; and FIGURE 5 is an isometric view of a form upon which two juxtaposed rotors may be generated when carrying out the method of the present invention.

Referring now to the drawings, FIGURE 1 shows a circular winding form or jig 10 suitable for use with the method of the present invention to produce the shrouded and bladed rotor disk core of FIGURE 3. Reference to bladed disk in this specification is intended to mean a bladed solid circular member as well as a bladed annulus. The jig 10 includes a ring of inwardly-pointing, bullet-shaped platform patterns, each of which is identical to platform pattern 11. Spaced from and encircling patterns 11 are a like number of sectors, each of which is identical to sector 12.

The radial edges of adjoining sectors are slightly separated one from the other as are the adjoining edges of the platform patterns and their adjacent sectors. The spaces between the sectors 12 in which the blade core portions 24 of FIGURE 3 are formed are shown for simplicity of presentation to define planes in each of which the axis of the rotor lies. However, it should be understood that such sectors can be shaped and contoured so as to define contoured and angled spaces therebetween which would conform with the angled and twisted airfoil shape of gas turbine blading when mounted in a rotor.

The platform patterns and sectors are secured, such as by bolting (not shown), to a subjacent cylindrical disk 13, the outside diameter of which is slightly larger than the diameter of the circle defined by the outer circumference of the ring of sectors 12. An annular metal bearing 14 may be releasably secured to the disk 13 at the center of the central area 15 enclosed within the ring of platform patterns 11.

The first step of the manufacturing process which results in an integral bladed and shrouded rotor core of FIGURE 3 involves the generation of the rotor core on the above-described form or jig. The core is generated by systematically and repeatedly winding on the form a continuous strand or roving 36 to which has been applied a uniform first force along the axis of the strand to place the strand under uniform axial tension. A second force is applied to the strand concurrently with the first force and toward the form.

The continuous strand is wound in a series of reaches, described in more detail later, through the spaces or gaps such as A in the radial direction, H in the circular direction or around the outer periphery of a sector such as 12 in FIGURE 1. Thus each of the reaches, which are segments of the continuous strand, are wound in a series according to the sequence selected, each consecutive reach being at an angle or wound in a direction different from the angle or direction of wind of the next preceding reach.

A series of reaches are wound until a substantially uniform layer of strand is disposed through the gaps and through the central area 15. Then a second series of reaches is wound on the form thus to build the article in multiple layers disposed substantially normal to the axis of the article. At this point the gaps between elements have been filled with the continuous strand or roving and that portion of the central area 15 not occupied by hub or plug 14 has been crisscrossed by multiple layers of the roving.

For highly stressed performance requirements, cloth such as binder impregnated woven glass cloth can be interspersed between layers of the rovings. The cloth adds to the structural integrity of the disk portion particularly in the axial direction. In addition, it prevents excess flow of binder during curing.

One type of high strength roving which is well suited for use under highly stressed conditions is sometimes referred to commercially as 20 end roving. It includes over 2000 separate glass filaments which are gathered parallel and twisted into a single continuous strand. The strand is then impregnated with a curable resinous material such as thermosetting epoxies, phenolics and the like prior to the winding process. However, it is obvious that other materials or roving constructions might be used. For instance, boron coated tungsten filaments might be used in place of glass; a single filament of a plastic or metallic material might be suitable in certain applications. The binder can, in appropriate cases, be metallic such as a brazing alloy.

The roving 36 can be wound in any one of a number of sequences including many series of windings with the particular sequence used depending on the desired application.

Referring to FIGURE 1, an example of one winding series of a sequence can start with a roving or strand 36 through blade core gap A toward blade core gap B adjacent sector 12, around the outer periphery of sector 12 and through the blade core gap C adjacent sector 12. Then the roving is passed across central area 15 and through blade core gap D adjacent sector 12a, around the outer periphery of sector 12a and through blade core gap E. The roving is then again passed across central area 15 toward blade core gap F, and so on around the jig symmetrically and back through blade core gap A. At the beginning of the second and of each consecutive subsequent blade core winding series the roving 36a might be directed from blade core gap A to blade core gap C and in successive series to blade core gap G at the beginning of the series. Thus the winding is shifted around the jig on each turn for symmetry and improved structural integrity.

In order to produce the integral inner shroud or blade platform portion 26 in FIGURE 3, a second set of winding series can be alternated with the above described series. The second series could follow the same plan as the first series except that the roving would be directed through the space between the sector and the platform pattern such as space H between sector 12 and platform pattern 11. To generate a continuous outer shroud with high hoop strength integrity, additional roving can be wound on the completed core structure a multiplicity of times around the outer periphery.

The strand material filling the blade gaps such as A, B, C, etc., define cores for the finished blades. Similarly, the strand or roving 36 which is wound around the outer periphery of the jig 10 when the roving is passed around a sector from one blade gap to an adjacent one defines the core for an outer circular shroud 25. When passed through a gap such as H between a sector and a platform pattern it defines the core for an inner shroud or blade platform 26. Since outer shroud 25 and inner shroud 26 of FIGURE 3 are formed integrally with the blades, there is little possibility of material failure at the junctures between the blades and the shrouds.

Just as the winding sequence may be changed for different article shapes, so may the tension force with which the roving 36 is to be wound be changed. However, the tension is not varied once the winding of any particular article or article core has begun. For example, a 15 pound uniform tension is suitable for a 20 end roving. As a result of this uniform tension on the roving, each of the reaches making up the core is stressed to the same extent as the others. Naturally, the blades, which are in tension in the radial direction with respect to the circular article, will also be equally stressed one to the other as their cores are formed from multiple layers of equally-stressed reaches. Thus the blades will not tend to distort or flex unevenly under heavy centrifugal loading such as is experienced by an axial flow compressor rotor in a gas turbine application.

After the wound core has been generated, the strands must be bound together or made rigid. One method of binding the strands of the core involves the use of pressure elements shown in position over form or jig 10 in FIGURE 2. These pressure elements include an outer metal band 16 which encircles the roving at the outer periphery of the sectors of jig 10. An intermediate metal band 17 lies between outer band 16 and the outer periphery of the sectors and is seated on the edge of the roving encircling the outer periphery of the sectors. There is an inner metal vand 18 which may be seated on the roving in the circular gap between the platforms 11 and the adjacent sectors 12 of FIGURE 1. A plurality of metal strips, such as strip 19, are seated on the edges of the roving in the radial blade core gaps between adjacent sectors. In addition to the various bands or strips, there is included a disk 20, which can have a centrally-located aperture in registry with the annular bearing 14 of FIGURE 1 if such a central plug is used, and a scalloped periphery 37 in registry with the pointed inner ends of the billet-shaped platform patterns.

As may be seen in FIGURE 2 these pressure elements are positioned on the jig 10, which is placed on the lower plate 21 beneath upper plate 23 of a heated platen press shown generally at 22. Plates 21 and 23 are movable one toward the other such as by lifting plate 21 toward parallel upper plate 23 by a suitable hydraulic mechanism disposed beneath the lower plate. The pressure elements, heated as a result of their being in contact with the heated press surfaces, not only compress the layers of fibers as the plates are brought one toward the other, but also cure the curable binder material with which the strands such as rovings have been impregnated.

After a predetermined period of time has elapsed, the upper and lower plates are moved apart so that the jig and pressure plates can be removed and the article such as a rotor core taken therefrom. As may be seen in FIGURE 3, the core resulting from use of the jig and pressure elements of FIGURES 1 and 2 includes a plurality of blade core portions 24, an outer circular shroud 25, a concentric inner shroud or platform 26, and an apertured central support or hub area 27 formed by the crisscrossed reaches of roving. In certain stator or fluid guide assemblies, either inner shroud 26 or outer shroud 25 could constitute the support. The area enclosed within the inner shroud 26 can be filled with a foamable material such as a foamable epoxy resin shown at 28, which, when foamed and cured, serves both to prevent extraneous gas flow through the hub area of the fan and to prevent vibration of the reaches crossing through the hub area. In certain situations, the circular outer shroud 25 may be unnecessary. If so, the shroud may be removed merely by trimming it from the ends of the blades.

To enhance the axial integrity of the article such as the rotor core of FIGURE 3, the rotor core and particularly the blade portions and the outer shroud, if it remains, may be surfaced or overwrapped with suitable strips or sheets of material bonded to the core as shown at 29 in FIGURE 4. A preferred material for this purpose is thermosetting plastic impregnated woven glass cloth which can be cured with the core during the regular press curing process.

A preferred method of applying a surface or facing of sheet material is to line the various gaps and surfaces of the jig with the sheet material before generating the core. After final winding, all other exposed surfaces such as of area 15 in FIGURE 1 and the outer periphery of the outer shroud can be covered with the sheet. FIGURE 4 is a fragmentary sectional view of a glass cloth covered rotor in which airfoil shaped blade core portion 24, outer shroud 25, inner shroud 26, central support member 27 (FIGURE 3) and foamed material fill 28 have integrally bonded thereto a cloth material 29.

Although the platform patterns have been removed from the hub area in the rotor and can be filled with a lightweight material such as 28 shown in FIGURE 3, it may be desirable to make hollow platform patterns of a lightweight material and leave them in place forming the blade portions and hub area about them for weight reduction purposes. If the platform patterns are to be used in this manner, they can best be provided with corrugated or grooved sides so that each pattern will be effectively interlocked with the adjacent reaches in the finished rotor.

Referring now to FIGURE 5, there will be seen a jig 30 upon which a pair of rotor cores may be generated simultaneously. The jig includes an upper winding form 31 which is back to back with a lower winding form 32. Each of these forms includes a plurality of slanted airfoil shaped winding surfaces such as surfaces 33 and 33a on form 31 and 33' and 33a' on form 32 respectively separated by vertical spacers such as spacers 34 and 34'.

A rotor core is generated on this jig 30 by repeated winding a continuous impregnated stand such as in the form of a strip of tape along the winding surfaces and across the hub area in the same general manner as was described earlier. However, in this example, the tape is not wound circumferentially around the outer periphery of the jig as was done before. Instead, it is wound from a winding surface on one of the winding forms to an adjacent winding surface on the opposite winding form. An example of this winding technique may be seen at 38, 38a and 38b representing several reaches in a series wound around the jig 30. Once the back to back cores have been generated, the impregnated tape is placed under pressure with a mating die or form and cured to bind or rigidify the wound strand into a rotor structure. The tape strands between the upper and lower winding forms, such as along circumferential dotted line 39, are ground or cut away to separate the two rotors. The hub areas of each of these rotors may be impregnated with a foaming material in a manner similar to that set forth above in the preceding description of the method of this invention. Similarly, a cloth covering can be applied as described before.

As will be evident from the aforegoing description, certain aspects of the invention are not limited to the particular details set forth in this specification. It is contemplated that various modifications will occur to those skilled in the art and it is therefore intended that the appended claims shall cover such modifications as do not depart from the true spirit and scope of the invention.

What is claimed is:

1. In a method of making an integral bladed circular member including a support and a plurality of blades integral with and radiating from the support, the steps of:
    winding a continuous strand on a suitable form while applying a uniform tension force to the strand along its axial length and at the same time applying a second force to the strand at an angle to the axial length of the strand and toward the form,
    the continuous strand being wound on the form in a series of reaches, each consecutive reach being at an angle different from that of the next preceding reach,
    the member being made in a plurality of layers disposed substantially normal to the central axis of the member, and then
        binding the wound strand together while on the form to produce the integral bladed member.

2. In the method of claim 1 in which:
    sheet material is located on a surface of the wound member prior to binding the wound strand together, and then
        the sheet material is bound to the strand concurrently with binding together the wound strand on the form.

3. In the method of claim 1 in which the strand is impregnated with a curable binder prior to winding on the form.

4. In the method of claim 1 for making an integral bladed disk member including a central support, a plurality of blades integral with and radiating from the support and an outer circular shroud integral with the blades at their radially outward end, the steps of:
    winding a continuous strand impregnated with a curable binder on a suitable form while applying a uniform tension force to the strand along its axial length and at the same time applying a second force to the strand at an angle to the axial length of the strand and toward the form, the continuous strand being wound on the form in a series of reaches, each consecutive reach being at an angle different from that of the next preceding reach, the member being made in a plurality of layers disposed substantially normal to the central axis of the member, and then rigidifying the member by binding the wound strand together while on the form to produce the integral bladed member.

5. In the method of claim 4 in which sheet material impregnated with a curable binder is placed between layers of the central support.

6. In the method of claim 4 in which:

sheet material impregnated with a curable binder is located on a surface of the wound member prior to binding the wound strand together, and then the sheet material is bound to the strand concurrently with binding together the wound strand on the form.

7. A method as in claim 1 of making an integral bladed disk member including a central support, a plurality of blades integral with and radiating from the support and an outer circular shroud integral with the blades at their radially outward end, comprising the steps of:

winding a continuous curable plastic binder impregnated strand on a suitable form while applying a uniform tension force to the strand along its axial length and at the same time applying a second force to the strand at an angle to the axial length of the strand and toward the form, the continuous strand being wound on the form in a series of reaches, each consecutive reach being at an angle different from that of the next preceding reach and alternating between circular and chordwise directions with respect to the surface of the disk member normal to its central axis until the portion of the member within the form has been made, winding additional strand circumferentially around the strand at the outer periphery of the form to increase the thickness of the windings of strand defining the outer circular shroud, the member being made in a plurality of layers disposed substantially normal to the central axis of the member, applying heat and pressure to the wound strand while on the form to press adjacent reaches of strand one toward the other and to cure the binder impregnating the strand to bind the strand together into an integral bladed circular member, and then removing the member from the form.

8. The method of claim 7 in which:

sheet material is placed between layers of the central support and is located on a surface of the wound member prior to applying heat and pressure, and then applying heat and pressure to the sheet material and to the wound strand concurrently while on the form to cure the binder impregnating the strand and sheet while pressing adjacent reaches of strand one toward the other and pressing the sheet material toward the strand to bind the strand and sheet together into an integral circular member.

9. An integral bladed member comprising:

a support, and a plurality of blades radiating from and integral with the support, the support and blades being made from a strand which is integral both with a blade and its adjacent portion of the support, the strand in the blades being under uniform tension radially with respect to the member, whereas the strand at the surface of the support between the blades is under uniform tension generally circumferentially with respect to the shape of the member.

10. An integral bladed disk member comprising:

a circular central support, a circular outer shroud, and a plurality of blades radiating between and integral with both the support and the outer shroud, the support, the blades and the outer shroud being made from a continuous, wound strand defining a plurality of layers disposed substantially normal to the central axis of the member, the strand in the blades being under uniform tension radially and the strand in the surface of the support between the blades and in the outer shroud being under uniform tension generally circumferentially with respect to the circular shape of the disk member.

11. An integral bladed rotor comprising:

a central support, a circular inner shroud surrounding and integral with the support, a circular outer shroud, and a plurality of blades radiating between and integral with both the inner shroud and outer shroud, the support, the inner shroud, the blades and the outer shroud being made from a continuous, wound strand defining a plurality of layers disposed substantially normal to the central axis of the member, the strand in the blades being under uniform tension radially and the strand in the inner and outer shrouds between the blades being under uniform tension generally circumferentially with respect to the shape of the rotor.

12. The bladed rotor of claim 11 in which:

sheet material is disposed between layers in central support.

13. The bladed rotor of claim 11 in which:

sheet material is bonded to surfaces of the disk member.

14. In a method of making a compositely formed, generally circular member having a plurality of radially extending blades, the steps of:

winding a continuous strand on a form having means for defining angularly spaced, bladed portions extending radially of the axis of the circular member to be made, said strand being wound on said form by being repeatedly drawn, under tension, radially inwardly and outwardly along the blade-defining portions thereof, said strand being drawn radially along each of said blade-defining portions approximately the same number of times so that each blade comprises approximately equal portions of drawn strand, and bonding the so drawn portions of strand together as components of a composite bladed member.

15. In a method of making a compositely formed, generally circular member as in claim 14 wherein:

said strand, each time it is drawn radially inwardly, is bent around suitable means on the form and then drawn radially outwardly along another blade-defining portion, angularly spaced from said first blade-defining portion.

References Cited

UNITED STATES PATENTS

| | | | |
|---|---|---|---|
| 1,537,790 | 5/1925 | Alpe | 64—13 |
| 1,605,356 | 11/1926 | Leipert | 64—13 |
| 2,857,094 | 10/1958 | Erwin | 230—134 |
| 3,047,191 | 7/1962 | Young | 156—175 |
| 3,057,767 | 10/1962 | Kaplan | 156—172 |

HENRY F. RADUAZO, *Primary Examiner.*